United States Patent [19]

Strong

[11] 4,082,185

[45] Apr. 4, 1978

[54] MANUFACTURE OF DIAMOND PRODUCTS

[75] Inventor: Herbert M. Strong, Schenectady, N.Y.

[73] Assignee: General Electric Company, Worthington, Ohio

[21] Appl. No.: 705,547

[22] Filed: Jul. 15, 1976

Related U.S. Application Data

[62] Division of Ser. No. 412,332, Nov. 2, 1973, Pat. No. 4,042,673.

[51] Int. Cl.² .................. C01B 31/06; B65D 85/00
[52] U.S. Cl. .................................. 206/525; 423/446
[58] Field of Search ................. 423/446; 63/32; 23/273 R, 273 SP, 289, 252 R; 106/42; 252/502, 503, 508; 206/525, 216, 524.1, 538

[56] References Cited

U.S. PATENT DOCUMENTS

| | | | |
|---|---|---|---|
| 3,142,595 | 7/1964 | Wentorf | 423/446 X |
| 3,148,161 | 9/1964 | Wentorf et al. | 252/502 |
| 3,268,457 | 8/1966 | Giardini et al. | 252/506 |
| 3,297,407 | 1/1967 | Wentorf | 423/446 |
| 3,310,501 | 3/1967 | Darrow et al. | 423/446 X |
| 3,317,035 | 5/1967 | Cannon | 206/525 |

OTHER PUBLICATIONS

Armagnac, "Popular Science," vol. 197, No. 3, 1970, pp. 82, 83, 134 & 137.
"Jewlers' Circular-Keystone," July 1970, pp. 186-189.

Primary Examiner—Edward J. Meros
Attorney, Agent, or Firm—Morgan, Finnegan, Pine, Foley & Lee

[57] ABSTRACT

Diamond crystals of controlled impurity content and/or impurity distribution and reaction vessel configurations for the production thereof are described. Combinations of "dopant", "getter" and "compensator" materials are employed to produce gem stones of unusual color patterns, or zoned coloration, using specific reaction vessel configurations.

19 Claims, 6 Drawing Figures

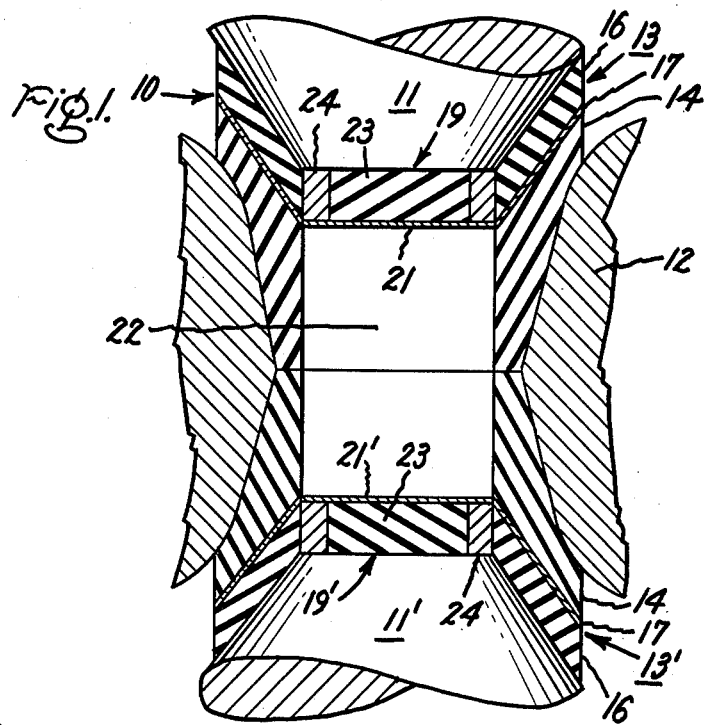
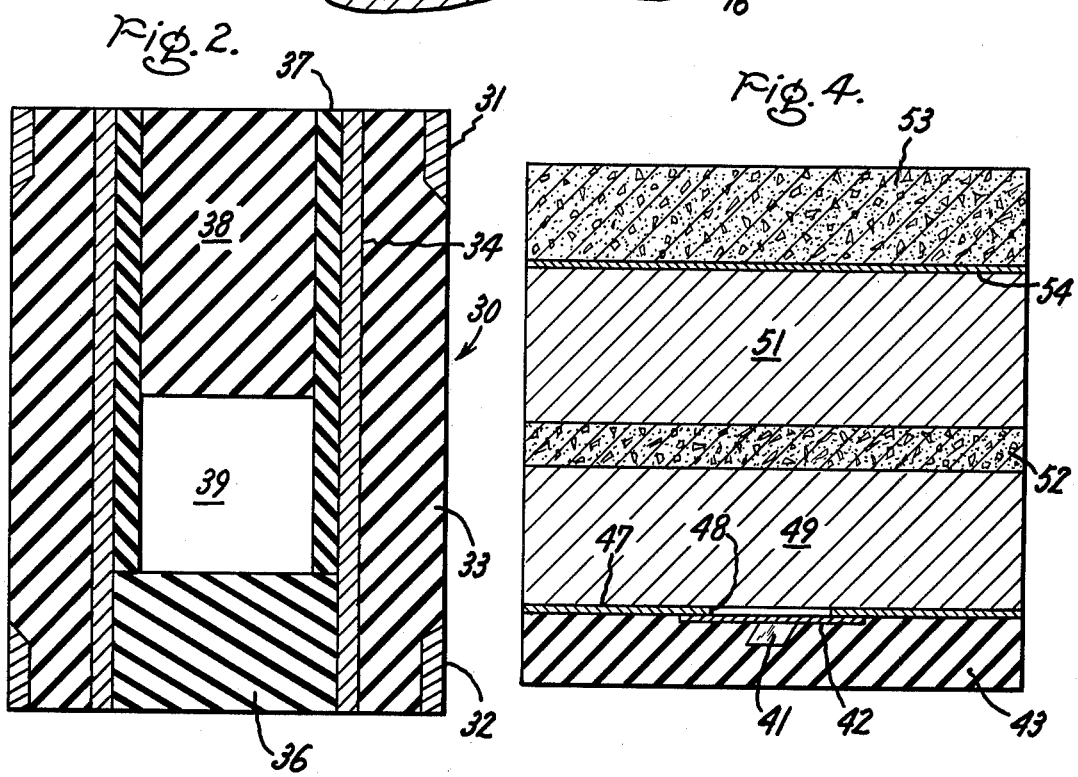

MANUFACTURE OF DIAMOND PRODUCTS

This is a division, of application Ser. No. 412,332 filed Nov. 2, 1973, now U.S. Pat. No. 4,042,673.

BACKGROUND OF THE INVENTION

The synthesis of diamond crystals by high pressure, high temperature processes has become well established commercially. Preferred methods for making diamonds are disclosed and claimed in U.S. Pat. Nos. 2,947,610 — Hall et al. and 2,947,609 — Strong. Apparatus for the conduct of such processes is described and claimed in U.S. Pat. No. 2,941,248 — Hall. The Hall et al, Strong and Hall patents are incorporated by reference.

Diamond growth in the aforementioned processes occurs by the diffusion of carbon through a thin metallic film of any of a series of specific catalyst-solvent materials. Although such processes are very successfully employed for the commercial production of industrial diamond, the ultimate crystal size of such diamond growth is limited by the fact that the carbon flux across the catalyst film is established by the solubility difference between graphite (the typical starting material) and the diamond being formed. This solubility difference is generally susceptible to significant decrease over any extended period due to a decrease in pressure in the system and/or poisoning effects in the graphite being converted.

On the other hand, in the method of growing diamond on a diamond seed crystal disclosed in U.S. Pat. No. 3,297,407 — Wentorf, Jr. (incorporated by reference) a difference in temperature between the diamond seed and the source of carbon is relied upon to establish a concentration gradient in carbon for deposition on the seed. Catalyst-solvents disclosed in the aforementioned Hall et al and Strong patents are used in the temperature gradient method as well. The growth of diamond on the seed material is driven by the difference in solubility of diamond in the molten catalyst-solvent metal at the nutrient (source of carbon) and at the seed, between which locations a temperature gradient exists. Most important, this general type of reaction vessel configuration presents a pressure stable system so that pressure can more readily be kept in the diamond stable region.

By very carefully adjusting pressure and temperature and utilizing relatively small temperature gradients with extended (relative to growth times for thin film method) growth times, larger diamonds can be produced by the method as taught in the Wentorf patent than by the thin-film method.

Attempts to reliably produce very high quality diamond growth, however, have presented a number of apparently mutually exclusive, yet simultaneously occurring problems. These problems are:

a. the strong tendency for spontaneous nucleation of diamond crystals near the diamond seed material (which occurs with increase in the temperature gradient over the "safe" value); if the growth period is extended to produce diamond growth from the seed of greater than about 1/20 carat in size the nucleated growth competes with the growth from the diamond seed with subsequently occurring collisions of multiple crystals that result in stress fractures therein, and b. either partial or complete dissolution of the diamond seed material in the melted catalyst-solvent metal during that part of the process in which the catalyst-solvent medium becomes saturated with carbon from the nutrient source and then melts; such dissolution produces uncoordinated diamond growth proceeding from spaced loci, which growths upon meeting, result in subsequent confused, flaw-filled growth.

In addition to overcoming the problems of spontaneous nucleation of diamond and diamond seed dissolution, it is highly desirable to be able to exercise reproducible control over the diamond growth process and, thereby, be able to produce novel diamond products, e.g. diamonds having unique color patterns and characteristics as well as affording the possibility of optimizing one or more physical properties in a given diamond.

In the context of this invention the following words have the meanings set forth:

a. dopant: an impurity which, if present at the site of growing diamond, will enter the growing diamond lattice and influence the physical, mechanical and/or electrical properties of the diamond growth;

b. getter: a material the atoms of which, if present at the site of growing diamond, will prevent or limit the entry of one or more dopant materials into the developing diamond growth, and c. compensator: a material the atoms of which, if present at the site of growing diamond will enter the growing diamond lattice and partially or completely offset the usual influence of one or more dopant materials present in the lattice with respect to physical, mechanical and/or electrical properties of the diamond.

SUMMARY OF THE INVENTION

The instant invention presents in combination in a single reaction vessel construction for the growth of large single crystal diamonds by the temperature gradient method:

a. means for suppressing spontaneous nucleation of unwanted diamond growth, b. means for isolating the seed crystal from the catalyst-solvent material until after the latter has become saturated with carbon thereby preventing seed crystal dissolution and c. means for the controlled quantitative and/or sequential introduction of impurity content thereby making possible reliably reproducible production of novel diamond crystal products.

BRIEF DESCRIPTION OF THE DRAWING

This invention will be better understood from the following description and drawing in which:

FIG. 1 illustrates one exemplary high pressure, high temperature apparatus useful in the conduct of the instant invention;

FIG. 2 illustrates in an enlarged view a basic reaction vessel configuration for containing various charge assembly embodiments to accomplish novel growth colorations in a single growth step by the instant invention;

FIG. 3 is a large scale view of one preferred reaction vessel construction for the preparation of "star" gem diamonds and FIGS. 4, 5 and 6 are also enlarged scale views of a series of charge assembly embodiments for containment in a reaction vessel construction such as is shown in FIG. 2.

DESCRIPTION OF THE PREFERRED EMBODIMENT

Figure 5:
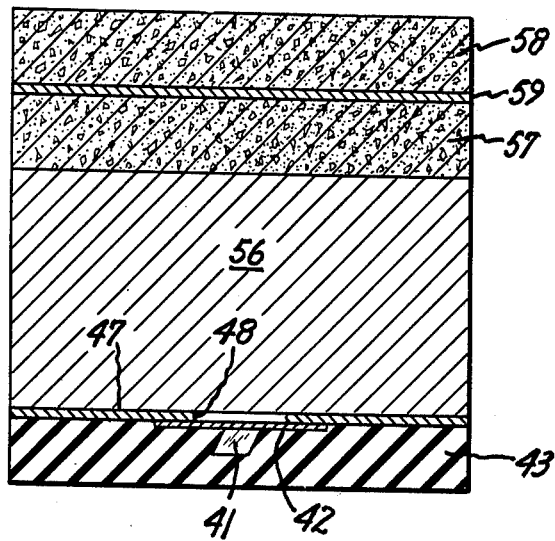
Figure 3:
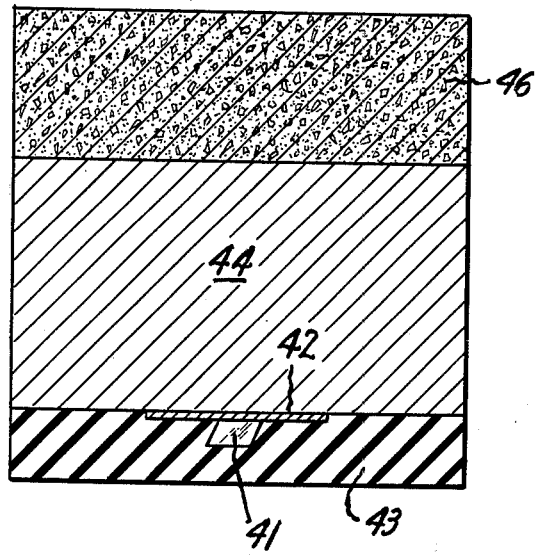

One preferred form of a high pressure, high temperature apparatus in which the reaction vessel of the instant invention may be employed is the subject of the aforementioned U.S. Pat. No. 2,941,248 — Hall and is schematically illustrated in FIG. 1.

In FIG. 1, apparatus 10 includes a pair of cemented tungsten carbide punches 11 and 11' and an intermediate belt or die member 12 of the same material. Die member 12 defines a centrally-located aperture and in combination with punches 11, 11' defines two annular volumes. Between punch 11 and the die 12 and between punch 11' and the die 12 there are included gasket/insulating assemblies, 13, 13', each comprising a pair of thermally insulating and electrically non-conducting pyrophyllite members 14 and 16 and an intermediate metallic gasket 17. The aforementioned assemblies 13, 13' together with end cap assemblies 19, 19' and electrically conductive metal end discs 21, 21' serve to define the volume 22 occupied by reaction vessel 30. Each end cap assembly comprises a pyrophyllite plug, or disc, 23 surrounded by an electrical conducting ring 24.

Reaction vessel 30 (FIG. 2) is of the general type disclosed in U.S. Pat. No. 3,030,662 — Strong (incorporated by reference) modified by the addition of steel retaining rings 31 and 32. Hollow cylinder 33 is preferably made of pure sodium chloride, but may be made of other material such as talc.

Broad criteria for the selection of the material for cylinder 33 are that the material (a) not be converted under pressure to a stronger and stiffer state as by phase transformation and/or compaction and (b) be substantially free of volume discontinuities appearing under the application of high temperatures and pressures, as occurs for example with pyrophyllite and porous alumina. The materials meeting the criteria set forth in U.S. Pat. No. 3,030,662 (column 1, line 59 through column 2, line 2) are useful for preparing cylinder 33. Positioned concentrically within and adjacent cylinder 33 is a graphite electrical resistance heater tube 34. Within graphite heater tube 34 there is in turn concentrically positioned cylindrical salt liner plug 36 upon which are positioned hollow salt cylinder 37 and its contents.

Operational techniques for applying both high pressures and high temperatures in this apparatus are well known to those skilled in the art. The foregoing description relates to merely one high pressure, high temperature apparatus. Various other apparatuses are capable of providing the required pressures and temperatures that may be employed within the scope of this invention. Pressures, temperatures, metallic catalyst-solvents and calibrating techniques are disclosed in the aforementioned patents incorporated by reference.

When reaction vessel 30 is disposed in space 22, heater tube 34 forms electrical contact between end discs 21, 21' so that heat may be controllably applied during conduct of the process.

Cylinder 37 together with plug 36 and cylindrical plug 38 define volume 39 adapted to contain a cylindrical charge assembly as, for example, is shown to larger scale in each of FIGS. 3-6. These charge assemblies enable (a) the introduction of quantities of boron and aluminum to make possible a unique "star" diamond and/or (b) the successive introduction into the growing diamond of varying coloration in a single large diamond crystal.

Thus, by making simultaneously available to the developing diamond of at least 1 part per million (ppm) of boron and 2500 ppm of aluminum by weight of the catalyst-solvent employed and properly orienting the diamond seed, a gem diamond crystal can be grown symmetrical about a cube axis and displaying a colorless or white pair of three-dimensional linearly-extending bands in crossed relationship when the crystal is viewed along the given axis of symmetry with the balance of the crystal having a blue color. The overall appearance of the pattern seen appears to be symmetrical.

In addition, a crystal can be formed in which colored diamond growth is enclosed within colorless diamond growth. Similarly, the first colored diamond growth may be enclosed within a second colored diamond growth. A variety of color combinations may be obtained depending upon the selection of dopants, getters and/or compensating materials. For example, nitrogen will produce color values ranging from yellow to green diamond, boron yields deep blue color diamond and aluminum, titanium and zirconium each favor colorless diamond growth.

Crystals of these types are not found in nature nor are they inherent in the production of diamond by the processes and structures taught in the art.

Ordinarily there is enough nitrogen present in the metallic catalyst-solvent metal and all reaction vessel components to strongly color diamond yellow whether produced by either the thin film method or the temperature gradient method. Typical nitrogen content is about 30–40 ppm. Thus, in the practice of this invention wherein diamonds made by the thin film method are typically used in the mass of nutrient the resulting diamond will be yellow in color (rich in nitrogen) in the absence of the addition of getter, compensator and/or dopant to the system.

Boron (and, of course, nitrogen) functions as a dopant. Aluminum functions as a getter for nitrogen and, if sufficient quantities of aluminum are present, will enter the lattice of the growing diamond and act as a compensator for such nitrogen as may enter the lattice. Titanium and zirconium each functions as a getter.

Contrary to earlier teachings it has been found that boron will not readily render diamond a blue color unaided. Thus, if as little as about 100 ppm of aluminum is present in the molten catalyst-solvent 20 micrograms of boron will turn diamond a deep blue. With no aluminum present the diamond growth will be yellow-green unless large quantities of boron (in excess of 20 mgms) are present in the catalyst-solvent bath. Since commercial borons contain as much as 900 ppm of aluminum, such boron will inherently produce a blue-colored diamond if used; particularly since aluminum is usually present as an impurity in the catalyst-solvent metal.

Thus, as is disclosed in U.S. Pat. No. 3,148,161 — Wentorf, Jr. et al. (column 5, lines 42–46 and column 9, lines 43–46) by using boron in a concentration from 0.1 to 20% by weight of the graphite (to be converted to diamond) a shade of color ranging from blue to deep purple will result, but the boron used contains traces of impurities including aluminum. However, calculations of the total amount of boron additive taught by Wentorf, Jr. et al. (assuming commercial boron were to be used having a 900 ppm content of aluminum) establish that the maximum aluminum that would be introduced to the system using the Wentorf, Jr. et al. teachings is 200 ppm (based on the mass of catalyst-solvent), whereas the minimum amount of aluminum required for "star" formation (crossed white bands in a blue field) appears to be about 2500 ppm (based on the mass of catalyst-solvent).

The production of successive colors during growth is accomplished by the use of combinations of dopant, getter and/or compensator materials arranged in the structure of the charge assembly whereby initially the growth medium will produce some preselected colored diamond growth and after a preselected period of diamond growth getter and/or compensator material enters the molten catalyst-solvent and causes growth of colorless color (or growth of a different color, as desired) to envelop the initial colored growth in an uninterrupted sequence.

The preparation of large size diamonds by the enlargement in stages of a small diamond has been proposed in the past. By such a process a small diamond is placed in a mass of graphite-catalyst mix (thin film method) and new diamond growth is deposited thereon to the extent possible. This enlarged crystal is then re-introduced into the apparatus for further enlargement, as desired. This sequential "onion-skin" growth has the disadvantage that occlusions of impurities are always introduced at the interface between the old growth and the new layer. Also, if layers of different colors of diamond growth be used, a sharp demarcation, or boundary, will be created between the successive layers.

It would be preferable to avoid occlusions and provide diffuse boundaries between colors. Such a diamond crystal requires a continuous growth during which the desired colorations are controllably introduced.

The charge assembly 40 (shown in FIG. 3) has been used for the successful production of dark blue star diamonds. By introducing a layer of non-metallic nucleation suppressing material, e.g. mica (as described in connection with FIG. 4 below) the arrangement shown in FIG. 3 can be made much more reliable. Seed 41 is protected by seed isolation disc (barrier layer) 42, which is preferably made of platinum but may be made of a metal selected from any of the metals in the group consisting of platinum, molybdenum, titanium, tantalum, tungsten, iridium, osmium, rhodium, palladium, vanadium, ruthenium, chromium, hafnium, rhenium, niobium and zirconium and alloys of these metals.

By using isolation disc 42, physical contact between the melted pool of catalyst-solvent metal and the diamond seed is prevented until after the pool of catalyst-solvent metal 44 has become saturated with carbon from nutrient mass 46. The timing is such that this carbon saturation occurs before barrier layer 42 is dissolved by alloying with the molten catalyst-solvent.

When such protection is not provided, erosion of the diamond seed material occurs. Considering a given diamond seed the erosion may either completely or partially destroy the seed. In the former case diamond nucleation can occur at spaced loci at the underside of the catalyst-solvent mass and in the latter case diamond growth usually proceeds from different loci on the eroded seed. Resultant new diamond growth in either case is lacking in coordination between the multiple growths and many flaws develop at the interface(s) when these separate growths meet.

Seed 41 is embedded in embedment layer 43 with a cube face exposed and in contact with disc 42 to provide the proper "template" for the new diamond growth. Mass 44 of metallic catalyst-solvent is disposed thereabove with disc 42 in contact with the underside thereof and a layer 46 of nutrient material (e.g. diamond plus a minor graphite content above the catalyst-solvent) containing boron.

Boron-containing diamond for layer 46 may be readily prepared as taught in the aforementioned Wentorf, Jr. et al. patent using commercial boron containing sufficient aluminum. The use of boron-doped diamond is preferred since such small concentrations of boron are needed (in excess of 1 ppm on the weight of the catalyst-solvent), however, the boron can be supplied in other ways. Thus, a small crystal of boron or boron carbide may be disposed in layer 46.

The requisite aluminum content (at least 0.25% by weight of the catalyst-solvent) may best be provided by using an aluminum alloy of the catalyst metals, e.g. Fe + 3 wt. % Al.

Aside from provisions for boron content, the nutrient material 46 may be composed of diamond, diamond plus graphite or may be entirely of graphite, if desired. In the case of diamond plus graphite, the graphite occupies any void space. It is preferred that the nutrient contain mostly diamond in order to reduce the volume shrinkage that can result during conduct of the process. In conduct of the process any graphite present at operating temperatures and pressures converts to diamond before going into solution in the catalyst-solvent metal. Thus, the pressure loss is minimized so that the overall pressure remains in the diamond-stable region at the operating temperature.

As operating pressure and temperature are reached the metallic catalyst-solvent 44 in contact with any graphite in nutrient 46 melts converting this graphite to diamond. Catalyst-solvent in contact with the diamond in layer 46 melts at slightly higher temperatures and dissolves the diamond. The melting catalyst-solvent progresses into layer 46 and the melting proceeds from top down in layer 44. In this manner when the carbon-rich molten catalyst-solvent reaches and alloys with layer 42 it already contains boron and aluminum ready for entry into the new diamond growth that is initiated when the molten-catalyst metal reaches the cooler diamond seed 41 and deposits carbon from solution. Some of the aluminum getters some of the nitrogen in the system and still other of the aluminum enters the diamond lattice. Some of the aluminum entering the lattice acts as a compensator for any nitrogen in the lattice tying up electrons of the nitrogen atoms whereby these nitrogen atoms become optically inactive. The rest of the aluminum is uncompensated and for some unknown reason collects in elongated, thin vertically extending planar zones in crossed relationship to each other. These zones appear white in contrast to the dark blue of the rest of the diamond growth. When viewed in the direction of the cube axis of symmetry (i.e. from the top of the diamond as it is formed in layer 44) these zones appear as crossed bands perpendicular to each other extending toward opposite corners of the crystal.

In each of the following examples (and in all examples set forth herein) the reaction vessel configuration provided a temperature differential in the 20°–30° C range, the nutrient consisted of 1 part by weight SP-1 graphite and 3 parts by weight 325 mesh diamond prepared by the thin film method, seeds used were ¼ to ½ mm and temperatures were measured using a Pt/Pt 10 Rh thermocouple:

EXAMPLE 1

[Run 43]

Pressure: 56 kb
Temperature (13.2–13.3 mv): 1340°–1370° C
Catalyst: Fe + 3 wt. % Al
Nutrient: 500 mgm + 0.05 mg $B_4C$ crystal
Nucleation Suppressing Layer: None
Isolation Barrier: 1 mil Pt disc as in FIG. 3
Seed Arrangement: as in FIG. 3
Time: 165 hours
Weight of Diamond Growth: 287.5 mgm The seeded diamond growth was dark blue with the characteristic contrasting crossed bands, or zones, described hereinabove. The high quality crystal had few interior flaws, phosphoresced to some extent after exposure to 2537 A light and was highly semi-conductive. A second small crystal grew out of the field of growth of the large seeded crystal. The large diamond was a truncated octahedron with modifying cube faces and symmetrical about the cube axis extending parallel to the vertical axis of vessel 30.

EXAMPLE 2

[Run 60]

Pressure: as in Example 1
Temperature (13.2–13.3 mv): as in Example 1
Catalyst: as in Example 1
Nutrient: 500 mgm + 0.05 mgm $B^{10}$
Nucleation Suppressing Layer: None
Isolation Barrier: 1 mil Pt disc as in FIG. 3
Seed Arrangement: in FIG. 3
Time: 163 ⅜ hours
Weight of Diamond Growth: 194.7 mgm A single crystal resulted appearing relatively flaw-free under 15X magnification. The color was dark blue with a white cross even more distinct than in the diamond produced in EXAMPLE 1. This crystal also phosphoresced to some extent from all except the bands, which appeared dark and the stone exhibited high semiconductivity. The diamond was a truncated octahedron with modifying cube faces.

When similar experiments were conducted using a substantially aluminum-free system the seeded crystal growth was yellow-green.

EXAMPLE 3

[Run 1231]

Pressure: 57 kb
Temperature (about 14.1 mv): 1420°–1440° C
Catalyst: 30Fe70Ni containing about 10 ppm Al
Nutrient: 200 mgm + 2.4 mgm $B_4C$
Nucleation Suppressing Layer: 5 mil Co disc with 80 mil hole in center
Isolation Barrier: ½ mil Pt disc
Seed Arrangement: Pt covered seed projecting into hole in Co disc
Time: 46 hours
Weight of Diamond Growth: 66.5 mgm One yellow-green diamond crystal grew from the diamond seed, an octahedron with small cube faces at points thereof. Boron content was found to be high and non-uniform and the crystal was highly semi-conducting. The crystal evidenced no absorption in the infrared region at 2800 wave lengths $cm^{-1}$ indicating there was no un-ionized (uncompensated) aluminum.

EXAMPLE 4

[Run 1233]

Pressure: as in Example 3
Temperature (about 14.1 mv): as in Example 3
Catalyst: as in Example 3
Nutrient: 200 mgm + 5 mgm $B^{10}$
Nucleation Suppressing Layer: 5 mil Co disc with 80 mil hole in center
Isolation Barrier: 1 mil Pt disc
Seed Arrangement: as in Example 3
Time: 78 hours
Weight of Diamond Growth: 114 mgm One yellow-green diamond crystal grew having dark blue-green striations. Boron content (of the order of 500 ppm) was high but not uniform. The crystal shape, electrical conductivity and IR absorption were as in the product of EXAMPLE 3.

Yellow-green diamonds found in nature are not semiconducting. Such yellow-green diamonds as produced and described in Examples 3 and 4 have the unique combination of size, semi-conductivity, strength and lack of absorption in the radiation band of 3.30 $\mu$ – 3.75 $\mu$. As such these crystals can be used as in-line windows for a high pressure reaction vessel and be used to monitor absorption bands of materials under pressure and an impressed voltage.

After termination of each run and reduction of temperature and pressure to permit removal of the reaction vessel 30, the new diamond growth embedded in the solidified metallic catalyst-solvent 44 readily detaches from the seeding site(s). The diamond(s) so prepared is easily removed by breaking open the mass 44.

Figure 6:
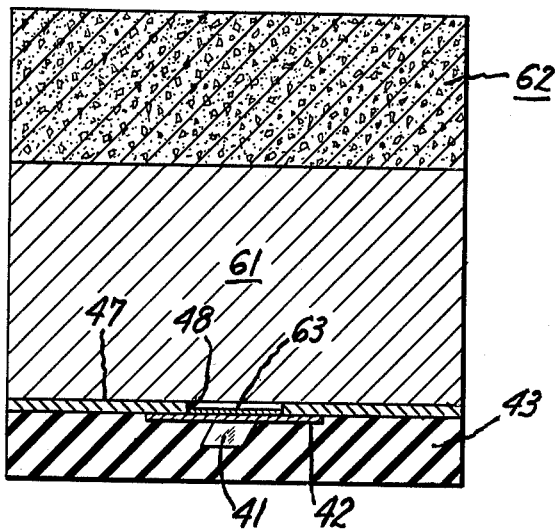

The charge assemblies of FIGS. 4–6 are arranged for the production of successive colors during uninterrupted growth of a single crystal. Identical numbers in these several views identify structure and/or materials serving identical functions in these arrangements. In each of these cell assemblies seed 41 is protected by isolation disc 42 and embedded in layer 43 with some desired orientation. The nutrient (except for additions of dopant, getter and/or compensator) is the same as described for layer 46. Also, each of these charge assemblies utilizes a diamond nucleation suppressing layer 47.

Nucleation suppressing layer 47 is composed of a material different from both the catalyst-solvent employed and isolation disc employed in any given charge assembly and is selected from the group consisting of cobalt, iron, manganese, titanium, chromium, tungsten, vanadium, niobium, tantalum, zirconium, alloys of the preceding metals, mica, polycrystalline high-density alumina, powdered alumina, quartz, silica glass, hexagonal boron nitride crystals, cubic boron nitride crystals, wurtzite-structure boron nitride crystals and silicon carbide protected with one of the metals of the platinum family. Preferably, in the last instance silicon carbide particles are mixed with an inert material such as sodium chloride and formed as a solid disc having the upper surface thereof (in contact with the underside of the catalyst-metal plug) covered with a thin layer of one of the platinum family metals.

When disc 47 is made of mica, polycrystalline high-density alumina, quartz, silica glass or other material presenting a layer with which the molten catalyst-solvent system will not alloy and/or cannot penetrate, it is necessary to provide hole 48 through disc 47 to accommodate contact between the molten catalyst-solvent bath and disc 42 for eventual contact with seed 41. Disc 47 may, of course, be provided with a hole when made of metal, if desired.

When a nucleation suppressing layer 47 is employed, enough of the surface of the underside of the catalyst-solvent metal plug is covered by the layer 47 to provide an environment adjacent the seed 41 to suppress spontaneous diamond nucleation for a considerable distance around diamond seed 41. Thus, the entire underside of the catalyst-metal plug may be covered by layer 47, but if less than the entire surface is covered, the layer 47 should extend at least 50% more distance from the seed than the lateral growth dimension desired. When layer 47 is provided with a hole the ratio of diameter of hole to largest dimension of seed 41 should be in the range of 1.5:1 to 5:1.

The exact mechanism (or mechanisms) by which discs, or layers, of the diamond nucleation suppressor materials function to reduce or eliminate diamond nucleation is not known for certain.

The thickness of the nucleation suppressing layer 47, when used, should range from about 1 to about 10 mils while the thickness of the seed isolation disc 42 should range from about one-half to about 10 mils. The natural mica, e.g. muscovite should first be fired at about 800° C for 12-15 hours. The preferred thickness of mica is about 2-3 mils.

The advantage of using both the barrier layer and the nucleation suppressing layer may be assessed as follows. When only the barrier layer is employed about 70% of the attempts to grow single, large, high quality diamonds will encounter spontaneous diamond nucleation and interference with growth of the new diamond growth from the seed. Sometimes this interference is not serious, but most often the growth from the seed is badly damaged. When a nucleation suppressing layer is used the improvement is so dramatic that only about 30% of the attempts to grow single, large, high quality diamonds will encounter spontaneous diamond nucleation. In fact, since the use of natural mica has been instituted, spontaneous diamond nucleation has not occurred in a single instance.

In FIG. 4 the provisions for producing successive zones of coloration are the separate plugs 49, 51 of catalyst-solvent, dual nutrient layers 52, 53 and getter and/or compensator disc 54.

With this arrangement, to prepare a diamond crystal having a yellow or green core covered with colorless growth, metallic catalyst-solvent layer plug 49 should be substantially free of aluminum, titanium, zirconium and manganese but may otherwise be any of the recognized catalyst metals and alloys. Preferably, the catalyst-solvent used is an Fe-Ni-Co alloy. Any of the nucleation suppressing layer and isolation barrier materials may be used (subject to the criteria set forth above). For a yellow core nutrient layer 52 should have diamond of uncorrected nitrogen content. Similarly, catalyst-solvent layer 49 will contain nitrogen contamination normally encountered. Thus, in the absence of special effort to offset the nitrogen normally present, this nitrogen content will dope the initial diamond growth developing on seed 41 giving this initial growth a deep yellow color. Colorless growth can then be applied by using non-aluminum-containing catalyst-solvent plug 51 in combination with a disc 54 of aluminum, titanium or zirconium. A high concentration of aluminum (from 1 to 10% by weight of the metallic catalyst-solvent) will insure colorless growth once the nutrient in layer 52 has been used up.

If the initial yellow color is to develop, care must be taken to insure a delayed diffusion entry of any significant amount of aluminum, titanium or zirconium into the melt before the yellow growth has been satisfactorily attained. By the time disc 54 has alloyed into catalyst-solvent layer 51 and worked through the diffusion path afforded by nutrient layer 52 there should be sufficient time delay for yellow core formation.

To develop a green core, very large concentrations of nitrogen are required. This can be accomplished by introducing nitrogen compounds e.g. iron nitride, which will decompose and release additional nitrogen to the catalyst-solvent system (layer 49).

Various arrangements may be used to increase the delay time before entry of the getter and/or compensator into the diamond-forming medium. Thus, the getter and/or compensator may be recessed into pressure-transmitting plug 38 or plug 43 in the form of a wire, rod or billet or may be separated from the catalyst-solvent by a thin layer of a high melting point metal, e.g. platinum, iridium, tungsten.

In order to provide a blue diamond core covered by colorless growth care must be taken that boron and aluminum are present at the same time for the initial growth and that all the boron is used up before the catalyst-solvent plug 51 can be contaminated. The catalyst-solvent for both layers 49 and 51 should contain aluminum (e.g. iron + 1-8 wt. % aluminum). The boron dopant should all be located in the lower region of nutrient layer 52. Non-metallic nucleation suppressing materials, e.g. mica should be used for layer 47. Provisions for the colorless aftergrowth would be the same as described for the yellow colorless combination.

FIG. 5 is designed in much the same manner for the preparation of a yellow or green core as in the arrangement in FIG. 4. A single catalyst layer 56 is used in combination with separate nutrient layers 57, 58 with getter and/or compensator disc 59 disposed therebetween. The composition of catalyst-solvent layer 56 and nutrient layer 57 will determine whether the core of the new diamond growth will be yellow or geeen as described in connection with FIG. 4.

FIG. 6 is specific to preparing a blue core diamond utilizing a localized concentration of boron atoms located in disc 63 as an alloy or compound of boron.

Subsequent growth (after the boron atoms are used up) may be colorless, pale yellow or pale green, if desired. Catalyst-metal layer 61 preferably contains aluminum to permit blue coloration by the boron. The nucleation suppressing layer 47 should be non-metallic. Nutrient layer 62 in combination with the amount of aluminum in layer 61 will determine whether the later-applied growth will be colorless, pale yellow or pale green. Also, if a large enough concentration of aluminum is present in catalyst-solvent layer 61, the initial growth can be a "star".

EXAMPLE 5

Pressure: 56 kb
Temperature (13.3–13.4 mv): 1360°–1380° C
Catalyst: 16.7 Co 41.3 Fe 42 Ni
Nutrient (as in FIG. 5): 120 mgm for layer 57 and 340 mgm for layer 58
Getter: 10 mil disc for Zr
Nucleation Suppressing Layer: 5 mil Co disc
Isolation Barrier: 1 mil Pt disc Seed Arrangement: ½ mm seed as in FIG. 5
Time: about 20 hours Due to the use of too low a temperature a cluster-type growth resulted. Some crystals were colorless, some yellow and a single crystal had a colorless portion adjacent a yellow portion. The initial growth was the yellow color. All diamonds were small, about 1 mm in size.

In each of the several reaction vessel constructions disclosed, the pressure-transmitting members 36, 37, 38 and 43 are made of material meeting the same criteria as the material for cylinder 33. All of parts 33, 36, 37, 38 and 43 are dried in vacuum for 24 hours at 124° C before assembly. Other combinations of shapes for the pressure-transmitting members may, of course, be employed. However, the arrangement of these parts shown in the drawings has been found to be the most convenient to prepare and assemble.

The temperature differential between the hot part of the cell (about half-way up the height of the cell) and the diamond seed pocket is preferably in the range of 20°–30° C. This differential depends upon the construction of the cell e.g., depth of mass of metallic catalyst-solvent, differential resistance in the heater tube, thermal conductivity of the end discs etc. Thus, the thickness of the catalyst-solvent plug helps determine the temperature differential prevailing in the reaction vessel. With a thicker mass of catalyst-solvent the temperature difference is greater. Also, vertical disposition of the catalyst-solvent is important in this respect.

Designations of the diamond seed are schematic and no attempt has been made to show the preferred disposition.

What we claim as new and desire to secure by Letters Patent of the United States is:

1. In a reaction vessel for introduction into the reaction volume of a high pressure, high temperature apparatus, said reaction vessel constituting an assembly of interfitting elements for enclosing diamond seed material and a source of substantially pure carbon separated by a mass of metallic catalyst-solvent for the diamond-making reaction disposed therebetween so as to provide a predetermined temperature gradient between said diamond seed material and said source of carbon under operating conditions of pressure and temperature in the diamond stable region of the phase diagram of carbon, said diamond seed material and said source of carbon being located in separate regions of said reaction vessel such that under said operating conditions said diamond seed material will be at a temperature near the minimum value of temperature for said temperature gradient and simultaneously said source of carbon will be at a temperature near the maximum value of temperature for said temperature gradient, the improvement comprising, a. a layer of isolating material in combination with a layer of diamond nucleation suppressing material, b. said isolation layer, said nucleation suppressing layer and said mass of metallic catalyst-solvent being of different materials in any given reaction vessel construction and said isolation layer being made of a material having a melting point, when in contact with diamond, that is higher than the melting point of the metallic catalyst-solvent saturated with carbon dissolved therein when in contact with diamond, c. said isolation layer being in contact with the diamond seed material and being disposed between the said diamond seed material and the mass of metallic catalyst-solvent, d. said nucleation suppressing layer being disposed in contact with the underside of the mass of catalyst-solvent material, e. the metallic catalyst-solvent being disposed in separate first and second layers and f. the source of carbon being disposed in separate third and fourth layers with said third layer located between said first and second layers and said second layer between said third and fourth layers, g. said first layer at least containing an impurity for coloring diamond growth.

2. The improvement recited in claim 1 wherein the isolation layer is made from a material selected from the group consisting of platinum, molybdenum, titanium, tantalum, tungsten, iridium, osmium, rhodium, palladium, vanadium, ruthenium, chromium, hafnium, rhenium, niobium and zirconium and alloys thereof.

3. The improvement recited in claim 2 wherein the nucleation suppressing layer is made of a material selected from the group consisting of cobalt, iron, manganese, titanium, chromium, tungsten, vanadium, niobium, tantalum, zirconium, alloys of the preceding metals, mica, polycrystalline high-density alumina, powdered alumina, quartz, silica glass, hexagonal boron nitride crystals, cubic boron nitride crystals, wurtzite-structure boron nitride crystals and silicon carbide protected with one of the metals of the platinum family.

4. In a reaction vessel for introduction into the reaction volume of a high pressure, high temperature apparatus, said reaction vessel constituting an assembly of interfitting elements for enclosing diamond seed material and a source of substantially pure carbon separated by a mass of metallic catalyst-solvent for the diamond-making reaction disposed therebetween so as to provide a predetermined temperature gradient between said diamond seed material and said source of carbon under operating conditions of pressure and temperature in the diamond stable region of the phase diagram of carbon, said diamond seed material and said source of carbon being located in separate regions of said reaction vessel such that under said operating conditions said diamond seed material will be at a temperature near the minimum value of temperature for said temperature gradient and simultaneously said source of carbon will be at a temperature near the maximum value of temperature for said temperature gradient, the improvement comprising:

a. a layer of isolating material in combination with a layer of diamond nucleation suppressing material, b. said isolation layer, said nucleation suppressing layer and said mass of metallic catalyst-solvent being of different materials in any given reaction vessel construction and said isolation layer being made of a material having a melting point, when in contact with diamond, that is higher than the melting point of the metallic catalyst-solvent saturated with carbon dissolved therein when in contact with diamond, c. said isolation layer being in contact with the diamond seed material and being disposed between the said diamond seed material and the mass of catalyst-solvent, d. said nucleation suppressing layer being disposed in contact with the underside of the mass of catalyst-solvent material, e. the interfitting elements additionally enclosing a concentration of a first material selected from the group consisting of aluminum, titanium, zirconium and alloys thereof and a concentration of a second material selected from the group consisting of nitrogen, boron and sources of these atoms, f. said first and second material being located relative to said diamond seed material so that the diffusion path from said first material to said diamond seed material is significantly longer than the diffusion path from said second material to said diamond seed material.

5. The improvement recited in claim 4 wherein the isolation layer is made from a material selected from the group consisting of platinum, molybdenum, titanium, tantalum, tungsten, iridium, osmium, rhodium, palladium, vanadium, ruthenium, chromium, hafnium, rhenium, niobium and zirconium and alloys thereof.

6. The improvement recited in claim 5 wherein the nucleation suppressing layer is made of a material selected from the group consisting of cobalt, iron, manganese, titanium, chromium, tungsten, vanadium, niobium, tantalum, zirconium, alloys of the preceding metals, mica, polycrystalline high-density alumina, powdered alumina, quartz, silica glass, hexagonal boron nitride crystals, cubic boron nitride crystals, wurtzite-structure boron nitride crystals and silicon carbide protected with one of the metals of the platinum family.

7. The reaction vessel of claim 1, wherein said first layer catalyst-solvent is substantially free of aluminum, titanium, zirconium and manganese and said first and third layers contain nitrogen, whereby said nitrogen will dope initial diamond growth.

8. The reaction vessel of claim 7, wherein said first layer catalyst-solvent is an Fe-Ni-CO alloy.

9. The reaction vessel of claim 7, wherein the nitrogen in said first and third layers is in sufficient concentration to cause yellow coloration.

10. The reaction vessel of claim 7, wherein the nitrogen in said first layer is in sufficient concentration to cause green coloration.

11. The reaction vessel of claim 7, wherein said second layer is substantially free of aluminum and a fifth layer consisting of a material selected from the group consisting of aluminum, titanium, zirconium and alloys thereof is located between said second and fourth layers, whereby colorless growth will occur beyond the doped coloration growth.

12. The reaction vessel of claim 11, wherein said fifth layer is aluminum having a concentration in the range of 1 to 10% by weight of the metallic catalyst-solvent.

13. The reaction vessel of claim 1, wherein said first and second layers contain aluminum, and said third layer contains boron adjacent said first layer, whereby initial diamond coloration is blue.

14. The reaction vessel of claim 13, wherein the first and second layers are iron $+1-8$ wt. % aluminum.

15. The reaction vessel of claim 13, wherein a fifth layer consisting of a material selected from the group consisting of aluminum, titanium, zirconium and alloys thereof is located between said second and fourth layers, whereby colorless growth will occur beyond the blue coloration growth.

16. The reaction vessel of claim 4, wherein said second material is a boron atom source in the form of a disc disposed between the underside of the mass of catalyst-solvent and said isolation layer, and said catalyst-solvent contains aluminum, whereby initial growth of diamond is blue.

17. The reaction vessel of claim 16, wherein said diamond seed material is a diamond seed having a cube face exposed to and in contact with said layer of isolation material and said boron and aluminum concentrations are, respectively, in excess of about 1 ppm and 2500 ppm of the weight of the catalyst-solvent.

18. The reaction vessel of claim 16, wherein said source of carbon includes an impurity which is operative with the aluminum in said catalyst-solvent to render diamond growth, subsequent to exhaustion of said boron atom source, in a color selected from the group consisting of colorless, yellow and green.

19. The reaction vessel of claim 4, wherein said source of carbon includes a first layer and a second layer with a disc of said first material disposed therebetween, said first layer of carbon being adjacent said mass of catalyst-solvent and said first layer of carbon and said mass of catalyst-solvent containing nitrogen, whereby initial diamond growth is color doped by nitrogen and subsequent growth is colorless.

* * * * *